F. HICKMAN.
Burring and Finishing Tools for Dental Engines.

No. 158,377. Patented Jan. 5, 1875.

WITNESSES
Harry King
Wm. J. Peyton

INVENTOR
Francis Hickman
By his Attorney
W. D. Baldwin

UNITED STATES PATENT OFFICE.

FRANCIS HICKMAN, OF READING, ASSIGNOR TO SAMUEL S. WHITE, OF PHILADELPHIA, PENNSYLVANIA.

IMPROVEMENT IN BURRING AND FINISHING TOOLS FOR DENTAL ENGINES.

Specification forming part of Letters Patent No. 158,377, dated January 5, 1875; application filed December 19, 1874.

CASE C.

*To all whom it may concern:*

Be it known that I, FRANCIS HICKMAN, of Reading, in the county of Berks and State of Pennsylvania, have invented certain new and useful Improvements in Burring and Finishing Tools for Dental Engines, of which the following is a specification:

Letters Patent of the United States, No. 149,312, were granted to me April 7, 1874, for rotary tools for dental engines, in which a rotary disk driven by a flexible shaft was shown mounted rigidly in a handle, which permitted the use of the disk at various angles to the driving-shaft.

My present invention constitutes an improvement upon the device shown in the Letters Patent above mentioned, and its object is to confer a wide range of adjustment upon the emery-disk or burring-wheel.

The subject-matter claimed is hereinafter particularly specified.

Figure 1:
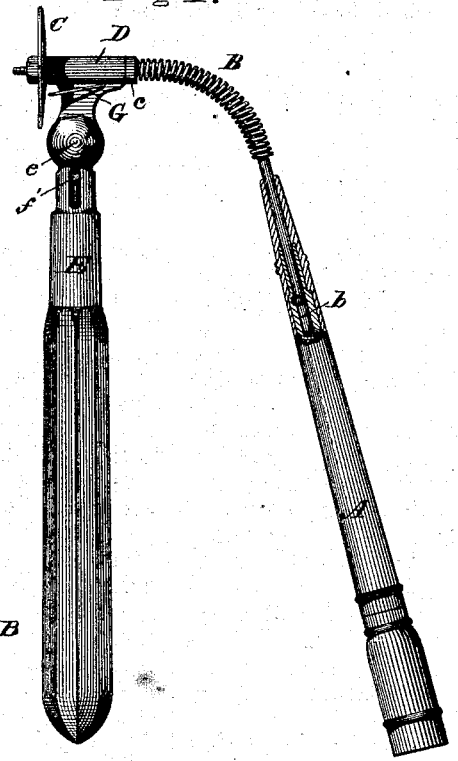
Figure 2:
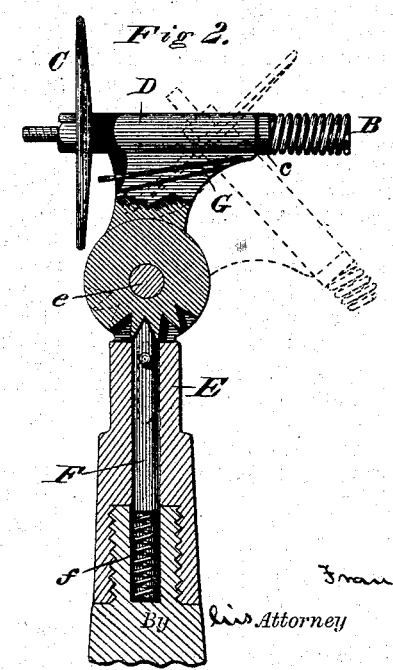

In the accompanying drawings, Figure 1 shows a view, partly in section, of my improved apparatus; Fig. 2, a vertical section through a portion of the apparatus, on an enlarged scale; and Fig. 3, a similar section, showing a method of mounting a burring-tool in the carrier of the revolving disk.

Figure 3:
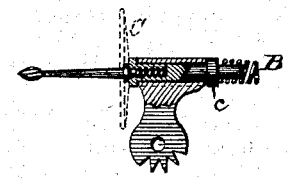

The chuck or tool-holder in the hand-piece A is rotated in any suitable well-known way. A bit or shank, *b*, is secured in the chuck or holder of the hand-piece by well-known means. A coiled-wire or other flexible shaft, B, connects the bits *b* with the mandrel or arbor *c*, revolving in bearings in a bracket, D, and carrying a disk or emery-wheel, C, on its opposite end, which extends through the bearing. This disk may be held on its arbor by means of a nut or screw, so as to permit it to be readily removed therefrom or replaced thereon. This arbor *c* may be provided with a screw-socket on its forward end, into which the shank of a burr or other tool may be inserted, as shown in Fig. 3, to take the place of the disk. The arbor-bracket D rocks on a pin, *e*, secured in a yoke on the handle E, by which means the angle of the arbor relatively to said handle may be varied. A locking-bolt, F, slides freely endwise in a suitable socket in the handle, being thrust outward by a spring, *f*, in said handle. Guide-pins *f'*, working in grooves in the handle, keep the wedge-shaped end of the locking-bolt in proper position to engage with the ratchet-teeth on the disk-bracket, by which means the arbor may be held locked at any angle desired relatively to the shaft.

The dotted lines in Fig. 2 indicate one position which the arbor may be made to assume, and the full lines another.

The pins *f'* project sufficiently far through their guide-grooves to permit them to be readily grasped by the operator when he wishes to retract the locking-bolt to change the angle of the arbor.

A wire, G, fixed on the bracket D, serves as a clamp to hold a sponge in contact with the revolving disk, in order to keep it moist; and, as it is mounted on the bracket, it always maintains its proper relation with the disk.

What I claim herein as new is—

1. The combination of the handle, the arbor-bracket pivoted thereon, the locking-rack on the bracket, and the spring locking-bolt, movable endwise in the handle, these members being constructed and operating in combination, substantially as hereinbefore set forth, whereby the angle of the arbor relatively to the handle may be varied.

2. The combination of the handle, the bracket pivoted thereon, the arbor rotating in the bracket, the disk mounted thereon, the coiled spring, and the bit, these members being constructed and operating substantially as hereinbefore set forth, whereby the tool is adapted to be driven from the hand-piece of a dental engine.

3. The sponge-holder mounted on the adjustable bracket, for the purposes set forth.

In testimony whereof I have hereunto subscribed my name.

FRANCIS HICKMAN.

Witnesses:
    G. G. HICKMAN,
    CASS HOLTON.